(12) United States Patent
Balachonzew et al.

(10) Patent No.: US 9,381,783 B2
(45) Date of Patent: Jul. 5, 2016

(54) AIR SPRING FOR A COMMERCIAL VEHICLE INCLUDING A ROLLING-LOBE FLEXIBLE MEMBER OF ELASTOMERIC MATERIAL HAVING ENDS PROVIDED WITH RESPECTIVE FASTENING BEADS

(71) Applicant: ContiTech Luftfedersysteme GmbH, Hannover (DE)

(72) Inventors: Boris Balachonzew, Garbsen (DE); Reinhard Stahmer, Garbsen (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 25 days.

(21) Appl. No.: 13/911,839

(22) Filed: Jun. 6, 2013

(65) Prior Publication Data

US 2013/0270753 A1 Oct. 17, 2013

Related U.S. Application Data

(63) Continuation of application No. PCT/EP2011/066851, filed on Sep. 28, 2011.

(30) Foreign Application Priority Data

Dec. 10, 2010 (DE) .......................... 10 2010 061 163

(51) Int. Cl.
*F16F 9/04* (2006.01)
*B60G 11/27* (2006.01)

(52) U.S. Cl.
CPC .............. *B60G 11/27* (2013.01); *F16F 9/0454* (2013.01)

(58) Field of Classification Search
CPC ................. F16F 9/05; F16F 9/02; F16F 9/04; F16F 9/0409; F16F 9/0463; B60G 11/28; B60G 11/26; B60G 17/052; B60G 17/04
USPC ............................................ 267/64.19–64.27
See application file for complete search history.

(56) References Cited

U.S. PATENT DOCUMENTS

| | | | | |
|---|---|---|---|---|
| 3,321,200 A | * | 5/1967 | Polhemus et al. | ......... 267/64.27 |
| 3,612,139 A | | 10/1971 | Marzocchi et al. | |
| 3,897,941 A | * | 8/1975 | Hirtreiter et al. | .......... 267/64.24 |
| 4,832,317 A | * | 5/1989 | Alaphilippe | .............. 267/64.27 |

(Continued)

FOREIGN PATENT DOCUMENTS

| | | |
|---|---|---|
| DE | 10 2005 051 706 | 4/2007 |
| WO | WO 2010066508 | * 6/2010 |

OTHER PUBLICATIONS

International Search Report dated Dec. 21, 2011 of international application PCT/EP2011/066851 on which this application is based.

*Primary Examiner* — Christopher Schwartz
(74) *Attorney, Agent, or Firm* — Walter Ottesen, P.A.

(57) ABSTRACT

An air spring for commercial vehicles includes a rolling-lobe flexible member which is made of an elastomeric material and which at one end thereof is fastened to a first attachment part and at the other end thereof is fastened to a second attachment part in the form of a roll-off piston. The ends of the rolling-lobe flexible member each have a fastening bead which is reinforced in each case by a bead core. At least one of the two bead cores consists of plastic material. In order to achieve greater strength of the fastening bead, the bead core or the bead cores include a multiply-wound, flat profile strip made of glass-fiber-reinforced plastic material.

9 Claims, 3 Drawing Sheets

(56) References Cited

U.S. PATENT DOCUMENTS

| | | | | |
|---|---|---|---|---|
| 5,382,006 A | * | 1/1995 | Arnold | 267/64.27 |
| 5,566,929 A | * | 10/1996 | Thurow | 267/64.24 |
| 5,580,033 A | * | 12/1996 | Burkley et al. | 267/64.27 |
| 6,264,178 B1 | * | 7/2001 | Schisler et al. | 267/64.27 |
| 6,719,279 B1 | * | 4/2004 | Koch et al. | 267/64.27 |
| 2011/0266728 A1 | | 11/2011 | Bank | |

* cited by examiner

AIR SPRING FOR A COMMERCIAL VEHICLE INCLUDING A ROLLING-LOBE FLEXIBLE MEMBER OF ELASTOMERIC MATERIAL HAVING ENDS PROVIDED WITH RESPECTIVE FASTENING BEADS

CROSS REFERENCE TO RELATED APPLICATIONS

This application is a continuation application of international patent application PCT/EP2011/066851, filed Sep. 28, 2011, designating the United States and claiming priority from German application 10 2010 061 163.8, filed Dec. 10, 2010, and the entire content of both applications is incorporated herein by reference.

FIELD OF THE INVENTION

The invention relates to an air spring for utility vehicles, having a first attachment part, in particular in the form of a cover, having a second attachment part in the form of a roll-off piston, and having a rolling-lobe flexible member made of elastomeric material. The ends of the rolling-lobe flexible member each have a fastening bead. These fastening beads are reinforced by respective bead cores wherein one end of the rolling-lobe flexible member is sealingly arranged on the first attachment part and the other end of the rolling-lobe flexible member is mounted seal-tight on the roll-off piston. At least one of the two bead cores is made of plastic.

BACKGROUND OF THE INVENTION

Air springs of the above type are known and are particularly commonly used in utility vehicles. The rolling-lobe flexible member of the air spring is made of an elastomeric material, preferably rubber or a rubber-like plastic, and has fastening beads at the ends. These fastening beads permit mounting onto the attachment parts such as flange plates or roll-off pistons. The cores of the fastening beads are conventionally made of steel wires.

It is known for the attachment parts such as roll-off pistons and/or covers or attachment plates to be produced from steel, aluminum or glass-fiber-reinforced plastic.

The use of plastic for the attachment parts has the advantage that corrosion is avoided and cost and weight advantages are attained with respect to the use of steel parts. It has, however, disadvantageously been found that the attachment parts made of plastic and the fastening beads expand to different extents at very high and very low operating temperatures of the air spring, and the air spring thus develops leaks because the steel wires as reinforcement cores of the fastening beads and the plastic attachment parts exhibit different expansion behavior.

United States patent application publication 2011/0266728 A1 is incorporated herein by reference and shows the fastening beads of a rolling-lobe flexible member with an embedded bead core made of plastic which is produced in an injection-molding process. The fastening bead of one rolling-lobe flexible member end is of conical form and bears against the associated conical seat surface of the roll-off piston under the action of the internal pressure of the rolling-lobe flexible member. In the case of flexible members with conical sealing surfaces, the bead core ensures a secure fit and a permanent preload on the cone. The other end of the rolling-lobe flexible member has a fastening bead capable of being flanged. The edge of the terminating flange plate is flanged seal tight around the fastening bead.

As a result of the use of plastic for the bead cores, the expansion problem arising owing to the steel wires as reinforcement cores is duly avoided, but the load capacity of the plastic cores produced by injection molding is limited.

SUMMARY OF THE INVENTION

It is an object of the invention to provide an air spring of the type described above which attains a higher load capacity of the fastening bead while simultaneously maintaining the advantages attained through the use of plastic.

This object is achieved according to the invention in that the one or more bead cores is or are made of a multiply wound, flat profile strip made of glass-fiber-reinforced plastic.

Through the use of multiply wound profile strips made of glass-fiber-reinforced plastic, it is possible to produce a less expensive, lighter and more corrosion-resistant bead core, the strength of which is comparable with that of a bead core made of steel or steel wire.

Through the use of glass-fiber-reinforced plastic in the bead core, which has the same coefficient of expansion as the glass-fiber-reinforced plastic used in the attachment parts, it is possible for an air spring to be used even under intense temperature fluctuations, very high or very low operating temperatures, without the air spring developing leaks or parts being damaged. The bead core and the attachment parts expand to the same extent under the influence of temperature, and thus ensure that the sealing action of the air spring is maintained over the entire temperature range to be expected during the use of the air spring.

If, under particular usage conditions, the attachment part made of plastic and bead core made of plastic exhibit different expansion behavior, the glass fiber portion in the profile strip of the bead core may be reduced or increased in order to cancel out the difference in expansion behavior of the bead core and the attachment part, such that the sealing action of the air spring is not jeopardized.

The portion of glass fibers in the plastic may be varied depending on the application. In this way, it is possible for the bead cores made of glass-fiber-reinforced plastic profile strip to be used even in conjunction with attachment parts made of steel or aluminum. A high glass-fiber portion reduces the difference in expansion behavior of the bead core and the attachment parts made of steel or aluminum, such that the sealing action of the air spring is not jeopardized.

In one advantageous embodiment of the invention, it is provided that the bead core is composed of polyamide with a glass fiber portion of 30%.

In a further advantageous embodiment of the invention, it is provided that the polyamide is PA 6.6. The term PA 6.6 is the chemical description of a glass fiber reinforced polyamide which is obtainable from 4PLAS LTD., a corporation of the United Kingdom and is sold under the trademark 4MID® as polyamide PA 6.6. The properties of polyamide (PA) vary from hard and tough PA 6.6 to soft and flexible PA 12. The physical and chemical properties of PA 6.6 are set forth in a material safety data sheet published by 4PLAS LTD and are as follows:

Form: Granules
Color: Various
Odor: Odorless
Solubility in water at 15° C.: Insoluble
Melting Point: Approx. 262° C.
Density: Approx. 1.36 g/cm$^3$
Ignition Point: >350° C.

In a further advantageous embodiment of the invention, the profile strip composed of glass-fiber-reinforced plastic for the bead core is produced by extrusion. The desired bend radius for the core may be set after the extrusion process by means of suitable method steps, such as for example bending in a roller frame.

In a further advantageous embodiment of the invention, the profile strip of the bead core is designed such that the glass fibers in the edge-proximate zones of the profile strip are oriented in the longitudinal direction. An advantage of this is that the glass fibers thus lie in the direction of loading, that is, in the circumferential direction, of the bead core, and a higher load capacity of the fastening bead is thus made possible.

This orientation of the glass fibers is promoted by the flat extrusion profile, since the contact surfaces with the plastic melt are enlarged during the extrusion.

In a further advantageous embodiment of the invention, the profile strip of the bead core is provided with a rubber encapsulation. This rubber encapsulation facilitates the vulcanization of the plastic core in the bead.

In a further embodiment of the invention, the profile strip of the bead core has a rectangular cross section.

The fastening beads according to the invention with glass-fiber-reinforced, wound plastic cores are characterized by a high strength. The sealing action of the air spring system is increased.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
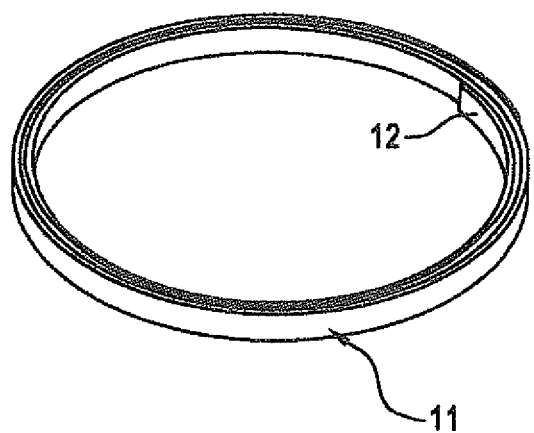
FIG. 1 is a perspective view of the plastic core.
Figure 2:
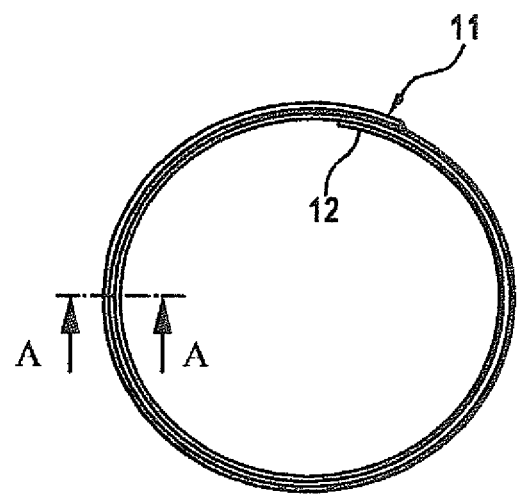
FIG. 2 shows the plastic core in a plan view.

The bead core 11 shown in FIGS. 1 and 2 is composed of a profile strip 12 composed of glass-fiber-reinforced plastic. The flat, rectangular profile strip 12 is wound in multiple windings to form an annular bead core 11.

Figure 3:
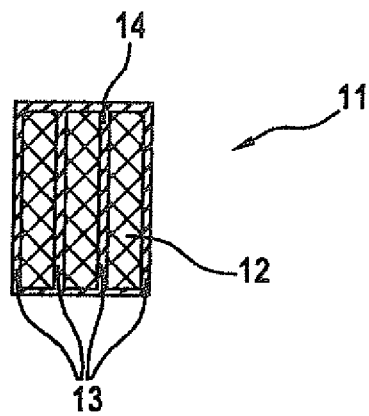
FIG. 3 shows a cross section through the plastic core taken along line A-A of FIG. 2.

FIG. 3 shows a cross section of the wound bead core 11. The profile strip 12 has a rubber encapsulation 13. An intermediate layer 14 composed of rubber is thus formed between the individual windings of the profile strip 12. The rubber encapsulation 13 facilitates the vulcanization of the bead core 11 in a fastening bead of the rolling-lobe flexible member 20, and serves to generate better cohesion between the windings of the profile strip 12.

Figure 4:
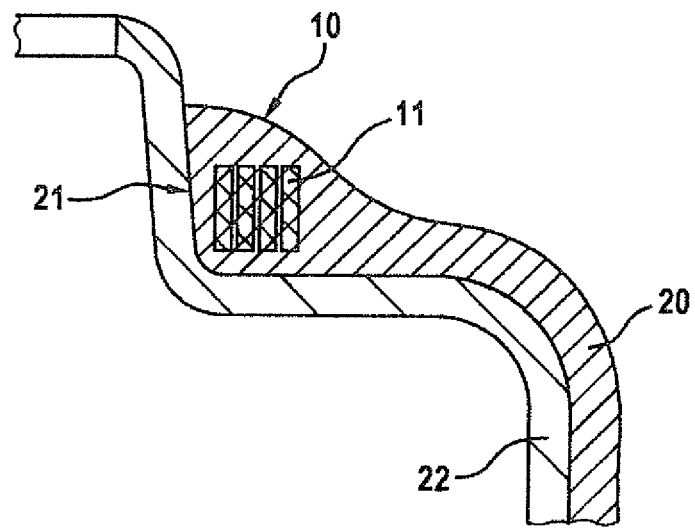
FIG. 4 is a detail of an air spring in the region of the conical seat of a roll-off piston.
Figure 5:
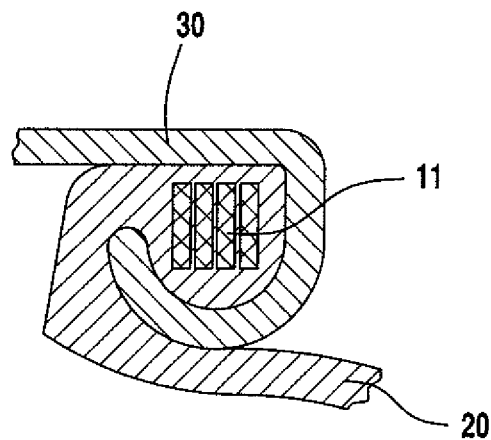
FIG. 5 is a detail of an air spring in the region of a cover thereof.

FIG. 4 shows a fastening bead 10 of the rolling-lobe flexible member 20 on a conical seat 21 of a roll-off piston 22. Thus, a first end of the rolling-lobe flexible member is connected to a first attachment part in the form of a roll-off piston. The second end of the rolling-lobe flexible member can, for example, be attached to a second attachment part in the form of a cover 30 such as shown in FIG. 5.

Figure 6:
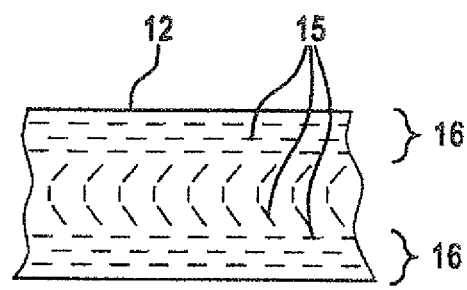
FIG. 6 is a schematic showing the orientation of the glass fibers in the profile strip of the plastic core.

FIG. 6 shows the orientation of the glass fibers 15, which are mixed into the plastic, after the extrusion of the profile strip 12. In the edge regions 16 of the profile strip 12, the glass fibers 15 are oriented in the longitudinal direction and thus in the circumferential direction of the bead core 11. As a result of this orientation of the glass fibers 15, the bead core 11 can accommodate higher loads without being damaged.

It is understood that the foregoing description is that of the preferred embodiments of the invention and that various changes and modifications may be made thereto without departing from the spirit and scope of the invention as defined in the appended claims.

LIST OF REFERENCE NUMERALS

10 Fastening bead
11 Bead core
12 Profile strip
13 Rubber encapsulation
14 Intermediate layer
15 Glass fibers
16 Edge region of the plastic profile
20 Rolling-lobe flexible member
21 Conical seat
22 Roll-off piston
30 Cover

What is claimed is:

1. An air spring for a commercial vehicle comprising:
a first attachment part;
a second attachment part configured as a roll-off piston;
a rolling-lobe flexible member made of an elastomeric material and having a first end and a second end and a first fastening bead disposed at said first end and a second fastening bead disposed at said second end;
said first fastening bead having a first reinforcing bead core completely embedded therein;
said second fastening bead having a second reinforcing bead core completely embedded therein;
said first end of said rolling-lobe flexible member being arranged seal tight on said first attachment part;
said second end of said rolling-lobe flexible member being arranged seal tight on said roll-off piston; and,
at least one of said first and said second reinforcing bead cores being made of a multiply wound, flat profile strip made of glass-fiber-reinforced plastic with said at least one reinforcing bead core defining a coil of mutually adjacent flat turns.

2. The air spring of claim 1, wherein at least one of said first and second bead cores is made of a polyamide which is 30% glass fiber.

3. The air spring of claim 2, wherein said polyamide is PA 6.6.

4. The air spring of claim 1, wherein said profile strip is made by extrusion.

5. The air spring of claim 1, wherein said profile strip has a rubber sheathing.

6. The air spring of claim 1, wherein said profile strip defines a rectangular cross section.

7. The air spring of claim 1, wherein said first attachment part is a cover.

8. An air spring for a commercial vehicle comprising:
a first attachment part;
a second attachment part configured as a roll-off piston;
a rolling-lobe flexible member made of an elastomeric material and having a first end and a second end and a first fastening bead disposed at said first end and a second fastening bead disposed at said second end;
said first fastening bead having a first reinforcing bead core completely embedded therein;

said second fastening bead having a second reinforcing bead core completely embedded therein;
said first end of said rolling-lobe flexible member being arranged seal tight on said first attachment part;
said second end of said rolling-lobe flexible member being arranged seal tight on said roll-off piston;
at least one of said first and said second reinforcing bead cores being made of a multiply wound, flat profile strip made of glass-fiber-reinforced plastic with said at least one reinforcing bead core defining a coil of mutually adjacent flat turns; and,
said profile strip defining a longitudinal direction and having two edge regions in which said glass fibers are oriented in said longitudinal direction.

9. An air spring for a commercial vehicle comprising:
a first attachment part;
a second attachment part configured as a roll-off piston;
a rolling-lobe flexible member made of an elastomeric material and having a first end and a second end and a first fastening bead disposed at said first end and a second fastening bead disposed at said second end;
said first fastening bead having a first reinforcing bead core completely embedded therein;
said second fastening bead having a second reinforcing bead core completely embedded therein;
said first end of said rolling-lobe flexible member being arranged seal tight on said first attachment part;
said second end of said rolling-lobe flexible member being arranged seal tight on said roll-off piston;
at least one of said first and said second reinforcing bead cores being made of a multiply wound, flat profile strip made of glass-fiber-reinforced plastic with said at least one reinforcing bead core defining a coil of mutually adjacent flat turns;
said first attachment part having a predetermined coefficient of expansion and said first reinforcing bead core corresponding to said first attachment part; and,
said first reinforcing bead core having a coefficient of expansion corresponding to said predetermined coefficient of expansion of said first attachment part thereby permitting said air spring to be used under intense temperature fluctuations.

\* \* \* \* \*